(12) United States Patent
Chen et al.

(10) Patent No.: US 8,496,289 B2
(45) Date of Patent: Jul. 30, 2013

(54) FOLDABLE FRAME STRUCTURE

(75) Inventors: Yuan-Ming Chen, Taichung (TW); Tuan-Yu Chen, Taichung (TW); Yen-Yu Chen, Taichung (TW)

(73) Assignee: Shin Fang Plastic Industrial Co., Ltd., Taichung (TW)

( * ) Notice: Subject to any disclaimer, the term of this patent is extended or adjusted under 35 U.S.C. 154(b) by 48 days.

(21) Appl. No.: 13/253,339

(22) Filed: Oct. 5, 2011

(65) Prior Publication Data

US 2013/0088053 A1   Apr. 11, 2013

(51) Int. Cl.
*A47C 4/00* (2006.01)
*A47B 3/00* (2006.01)

(52) U.S. Cl.
USPC ............ 297/42; 297/44; 108/130; 248/166; 248/188.6

(58) Field of Classification Search
USPC ................. 297/42, 44, 183.5; 108/124, 125, 108/134, 135, 130; 248/163.1, 165, 166, 248/168, 169, 439, 188.6
See application file for complete search history.

(56) References Cited

U.S. PATENT DOCUMENTS

| | | | | |
|---|---|---|---|---|
| 2,689,603 A * | 9/1954 | Smith | | 297/24 |
| 4,712,830 A * | 12/1987 | Charbrol et al. | | 297/42 |
| 6,854,797 B1 * | 2/2005 | Thomas | | 297/16.1 |
| 7,497,514 B2 * | 3/2009 | Ramsey et al. | | 297/234 |
| 8,292,361 B2 * | 10/2012 | Chen | | 297/42 |
| 2010/0236457 A1 * | 9/2010 | Parizek et al. | | 108/64 |

* cited by examiner

*Primary Examiner* — Sarah B McPartlin
(74) *Attorney, Agent, or Firm* — Egbert Law Offices, PLLC

(57) ABSTRACT

A pitman-style foldable frame structure has an innovative and unique assembled design. The frame structure includes foldable panels, a central spindle, lateral frames, oblique connecting rods, a control device, and a central connecting frame. The frame structure offers improvement over the prior art in lowering the material cost and increasing structural support strength and rigidity of the pitman-style foldable frame and achieves practical advancement and better industrial utilization effect.

7 Claims, 9 Drawing Sheets

US 8,496,289 B2

FOLDABLE FRAME STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a foldable frame, and more particularly to an innovative design of a pitman-style foldable frame.

2. Description of Related Art Including Information Disclosed Under 37 CFR 1.97 and 37 CFR 1.98.

Foldable frames are widely used in products like chairs, tables, sleds, etc, so that the products can be folded to a smaller overall size to save storage space when they are not used.

In the structural design of prior-art foldable frames, it is common to use cross connecting rods for folding and moving. However, in actual applications, it is found that such a structural design has the disadvantage of high material cost because the length of each cross connecting rod has to be considerably longer than half of the length of the foldable frame area. Moreover, the longer the cross connecting rods are, there will be more deformation and less support in the middle section of the rods, causing problems and disadvantages of insufficient support strength and lower rigidity.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The facts of efficacy advancement of the present invention are as follows:

The pitman-style foldable frame structure of the present invention offers an innovative and unique assembled design mainly through said foldable panels, a central spindle, lateral frames, oblique connecting rods, a control device, and a central connecting frame, so that the present invention can improve the structure known from prior art in lowering the material cost and increasing structural support strength and rigidity of the pitman-style foldable frame and achieve practical advancement and better industrial utilization effect.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
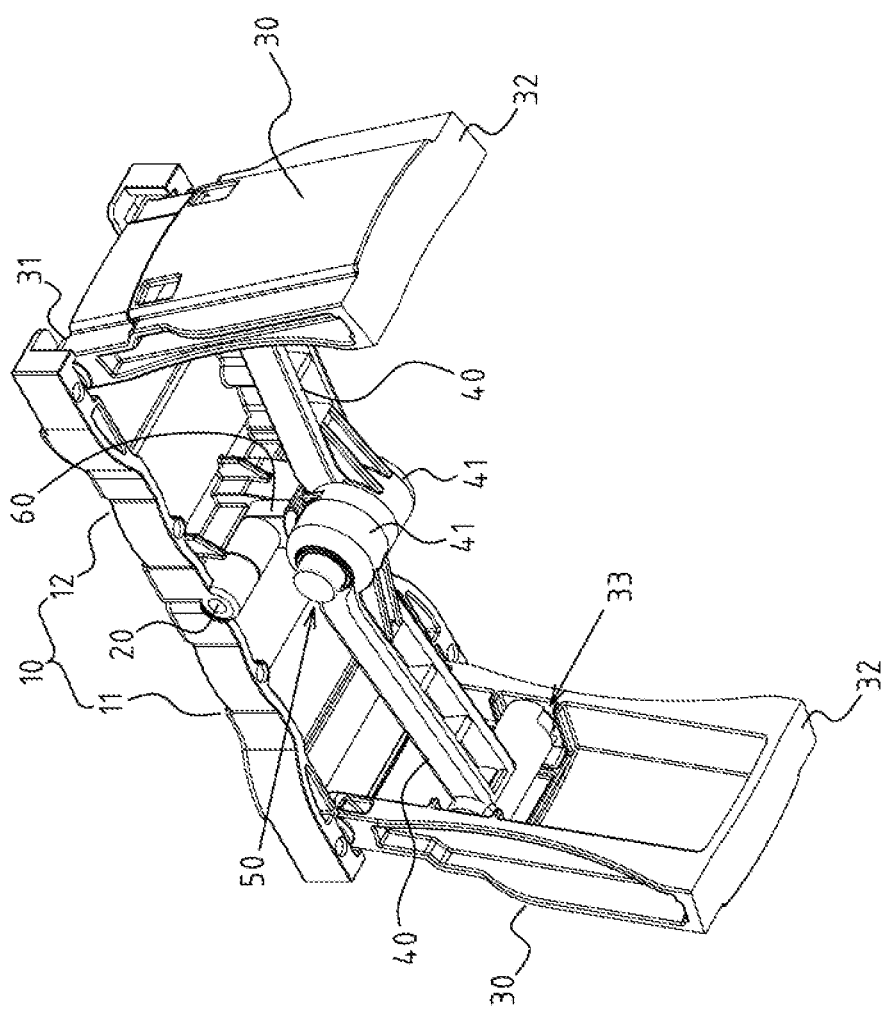
FIG. 1 is an assembled perspective view of a preferred embodiment of the structure of the present invention.

FIGS. 1, 2, 3 and 4 depict a preferred embodiment of the pitman-style foldable frame structure of the present invention. However, it is to be understood that such an embodiment is illustrative only and is not intending to limit the scope of the invention in any manner.

Said pitman-style foldable frame structure has a foldable panel 10, including a first panel 11 and a second panel 12, wherein the relative inside ends of the first panel 11 and second panel 12 have contacting surfaces 110, 120 to contact against each other when the first and second panels 11, 12 are unfolded. On the lower sides of the contacting surfaces of the first and second panels 11, 12, pin connecting ears 13, 14 with inter-aligned and inter-communicating spindle holes 130, 140 are configured. The relative outside ends of the first panel 11 and second panel 12 are configured with a frame pin connecting part 15.

A central spindle 20 goes through the spindle holes 130, 140 in the pin connecting ears 13, 14 configured on the first and second panels 11, 12 of the foldable panel 10, to form a revolving spindle when the first and second panels 11, 12 of the foldable panel 10 are folded.

Two lateral frames 30 are attached to the relative outside ends of the first and second panels 11, 12 of the foldable panel 10. Each lateral frame 30 has a pin connecting end 31 and a landing end 32, wherein the pin connecting end 31 is to be attached to the frame pin connecting part 15 configured on the relative outside end of the first and second panels 11, 12. Further, a pitman pin connecting part 33 is configured on the inner side and at a certain height of each lateral frame 30 between the pin connecting end 31 and the landing end 32.

Two oblique connecting rods 40 are attached between the two lateral frames 30, wherein the relative outside ends of the two oblique connecting rods 40 are relatively attached through pin-joint to the pitman pin connecting parts 33 configured on the two lateral frames 30. The relative inside ends of the two oblique connecting rods 40 form an upper-pointed angle and extend to the spacing position under the central spindle 20. The relative inside end of the two oblique connecting rods 40 are configured with a pin sleeving part 41 to be attached to each other through the pin-joint.

A control device 50 is attached to the corresponding position on the pin sleeving part 41 configured on the relative inside end of the two oblique connecting rods 40. The control device 50 comprises a control part 51 and a locking member 52, wherein, when the locking member 52 is positioned on the preset first position, the pin-joint state of the relative inside ends of the two oblique connecting rods 40 will be locked, and, when the locking member 52 is positioned on the preset second position, the pin-joint state of the relative inside ends of the two oblique connecting rods 40 will be released and can rotate around the spindle. The control part 51 is used to control and shift the position of the locking member.

A central connecting frame 60 is attached between the central spindle 20 and the relative inside ends of the two oblique connecting rods 40, wherein the top end of the central connecting frame 60 is configured with a through hole 61 for the central spindle 20 to go through, and the bottom end of the central connecting frame 60 is configured with an attaching seat 62 to be attached between the pin sleeving parts 41 configured on the inside ends of the two oblique connecting rods 40.

Two contacting parts 63 are formed through protrusion on the two relative sides on top of the attaching seat 62 of the central connecting frame 60, and correspondingly, a receiving part 42 is configured on the relative inside end of the two oblique connecting rods 40 for the contacting part 63 to contact against, so that the central connecting frame 60 can be linked between the central spindle 20 and the relative inside ends of the two oblique connecting rods 40 in a rigid vertical angle.

Figure 7:
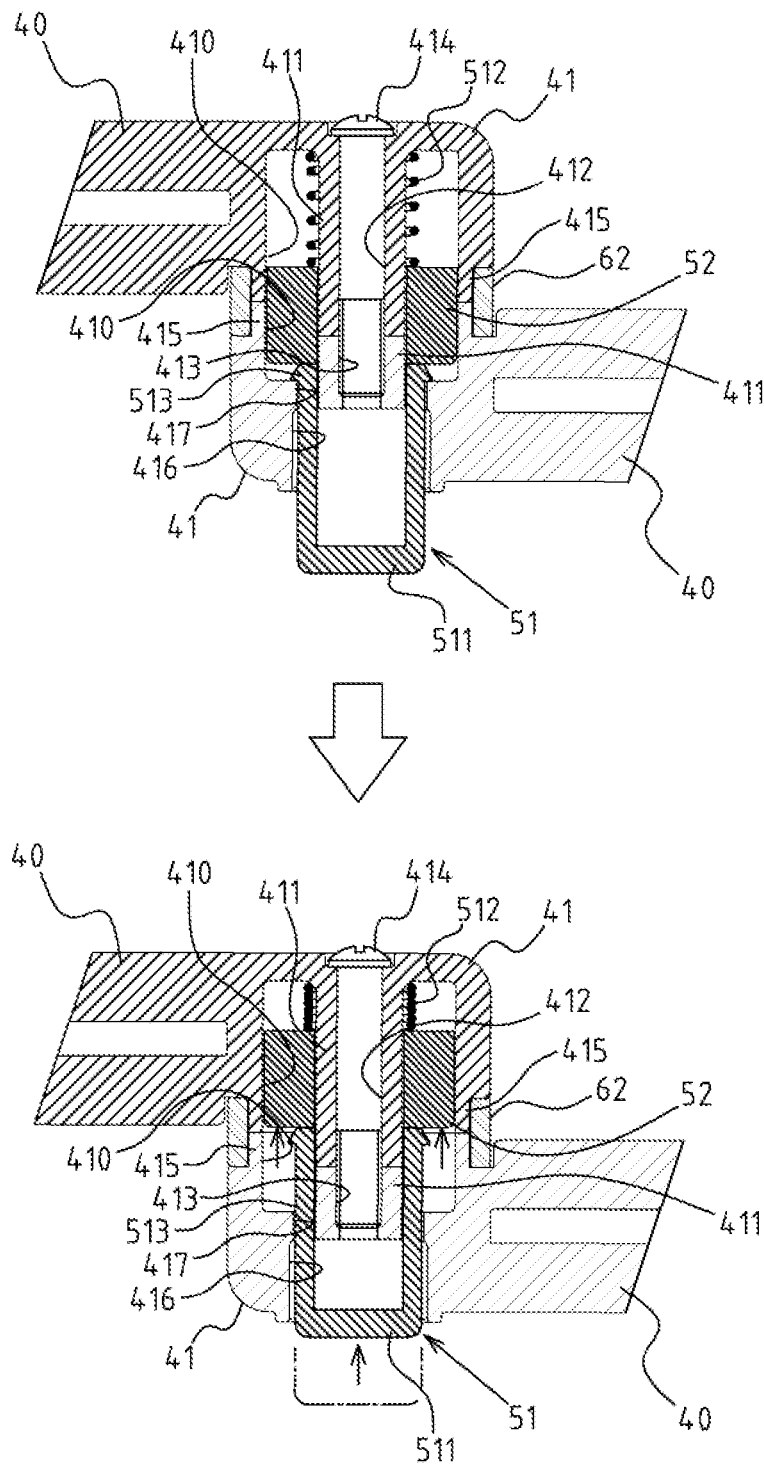
FIG. 7 is a schematic view of the action shift states of the control device of the present invention.
Figure 8:
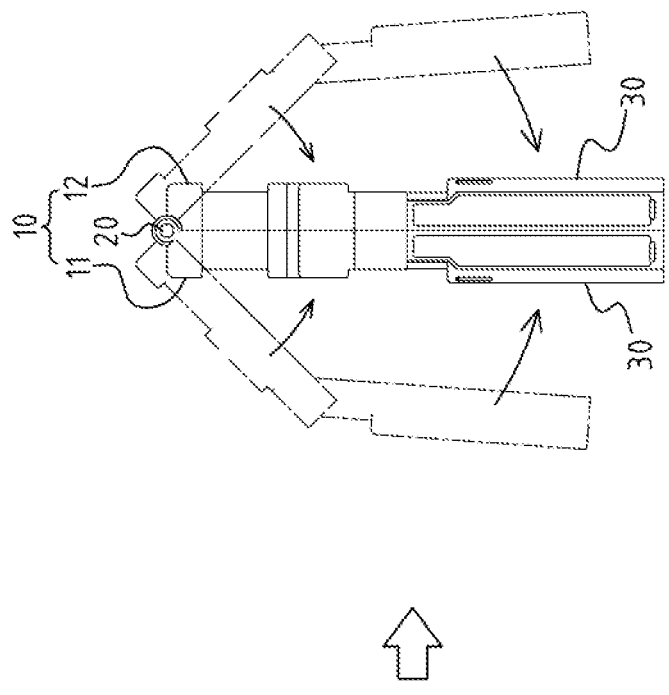
FIG. 8 is a schematic view of the folded state of the pitman-style foldable frame of the present invention.
Figure 8:
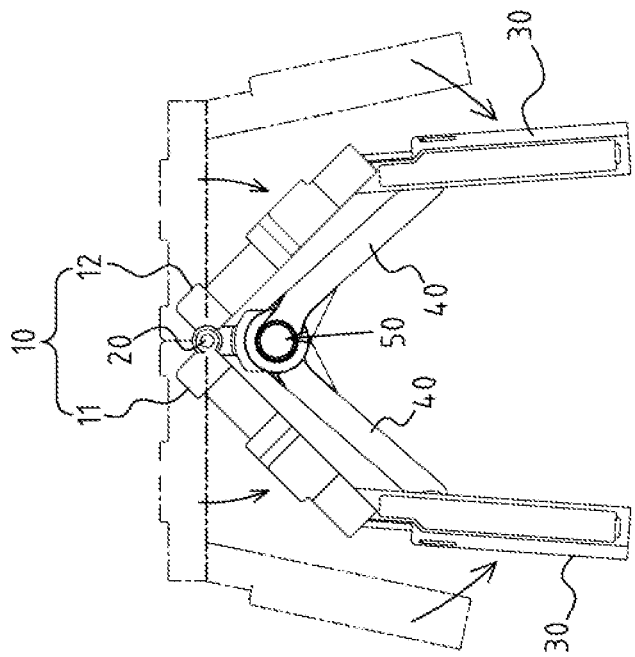

Further, the pin sleeving parts 41 configured on the relative inside ends of the two oblique connecting rods 40 comprise two inter-communicating concave spaces 410 with stopping parts 418 (only marked in FIG. 4), and there are two inter-contacting projecting columns 411 in the center of the concave space 410. The two projecting columns 411 are configured respectively with a through hole 412 and a screw hole 413, so that they can be fixed through a screw 414 (or a screwing member with a screw matching a nut). Further, the corresponding ends of the two pin sleeving part 41 are configured with reducing projecting pipes 415 to contact against each other, and the attaching seat 62 configured on the bottom end of the central connecting frame 60 is shaped like a ring and sleeves the peripheral of the reducing projecting pipe 415. The pin sleeving part 41 configured on the oblique connecting rods 40 is further configured with a receiving groove 416, and on part of the inside wall of the receiving groove 416, a through hole 417 is configured to inter-communicate with the concave space 410 of the pin sleeving part. The locking member 52 of the control device 50 is configured in the shape of a block with a stopping edge 521 (only marked in FIG. 4) (note: this embodiment is configured in an S-shaped block), and is housed inside the two concave spaces 410 in a movable manner. When the locking member 52 is on the intersecting position of the two concave spaces 410 (the state shown in the upper drawing of FIG. 7), the relative inside ends of the two oblique connecting rods 40 are locked. The center of the locking member 52 has a through hole 520 loosely shielding the projecting columns, and the control part 51 of the control device 50 includes a push button 511 and a return spring 512.

The push button 511 is attached in the receiving groove 416 configured on the outside of the pin sleeving part 41, and the outside end of the push button 511 projects out of the receiving groove 416, and the inside end of the push button 511 has a projecting elastic clasping pin 513 to go into and be locked inside the through hole 417 configured on the inner wall of the receiving groove 416, and the return spring 512 is supported between the locking member 52 and the end wall of a concave space 410, so as to push the locking member 52 to the intersecting position of the two concave spaces 410 to reach the locked state. In this way, when the push button 511 shrinks under pressure (the state shown in the lower drawing of FIG. 7), the elastic clasping pin 513 will simultaneously extend inside and push the locking member 52 to shift to the inside of one concave space 410, so that the relative inside ends of the two oblique connecting rods 40 are released and become rotatable, and meanwhile press the return spring 512 to accumulate the elastic force for returning.

Figure 2:
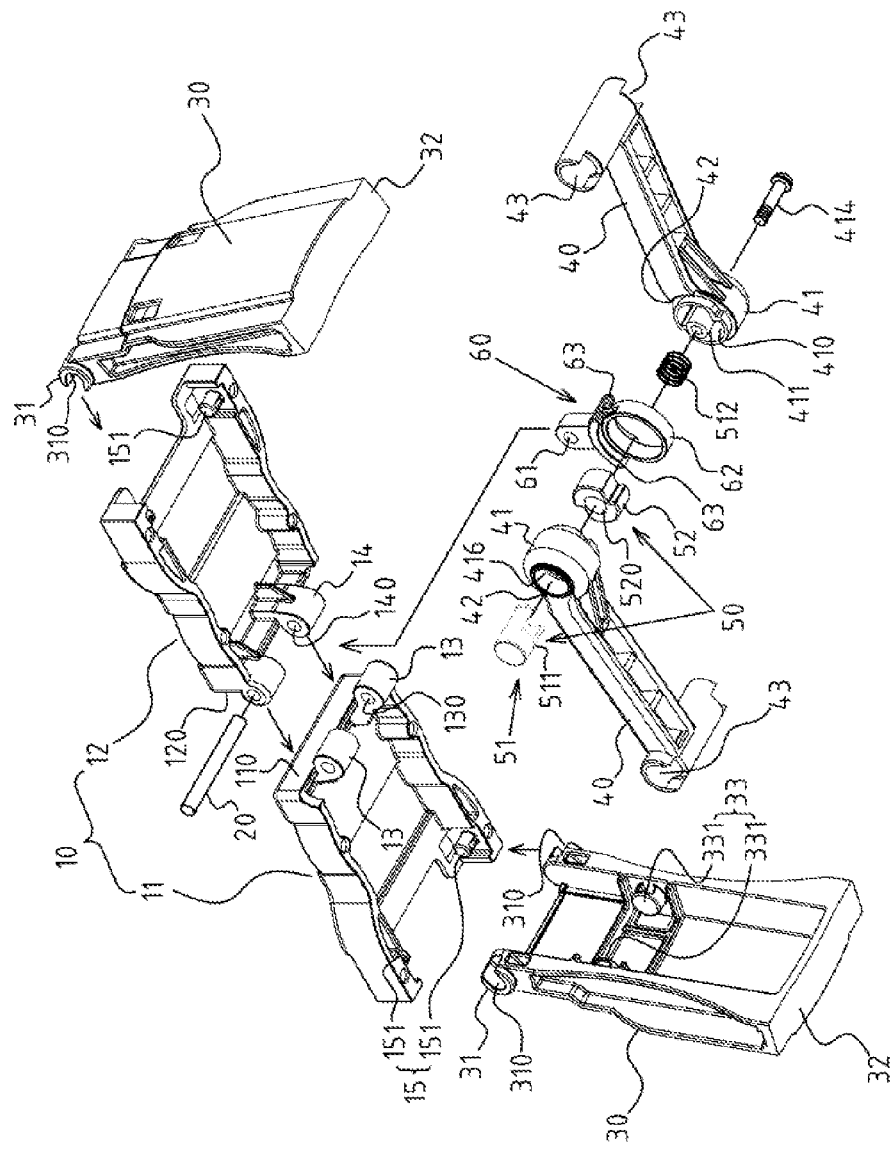
FIG. 2 is an exploded perspective view of a preferred embodiment of the structure of the present invention.
Figure 5:
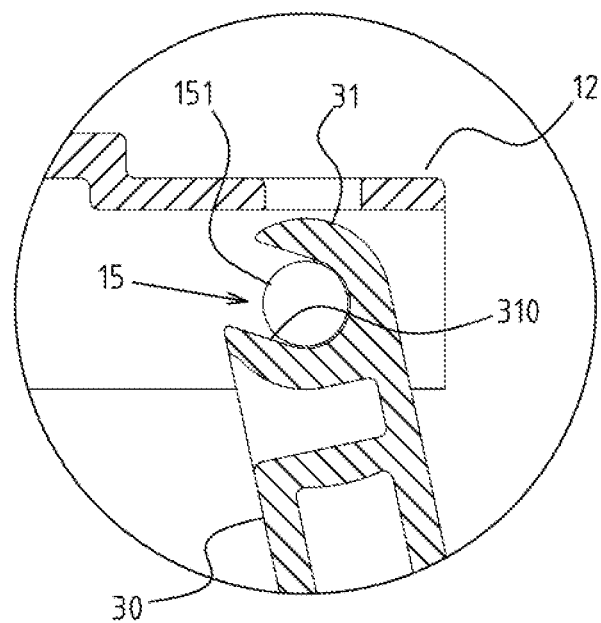
FIG. 5 is a sectional view of the pin-joint part between the lateral frames and the first and second panels of the present invention.

As disclosed in FIGS. 2 and 5, the frame pin connecting part 15 configured on the relative outside end of the first and second panels 11, 12 can be composed of two spaced projecting columns 151, and at the corresponding position of the pin connecting end 31 of the two lateral frames 30, two oblique angle attaching slots 310 can be configured. Said oblique angle attaching slot 310 must have a preset opening angle to join with the projecting column 151. Such a design provides an easy structure for connection through pin-joint between the lateral frames 30 and the first and second panels 11, 12 without the need of any other auxiliary positioning parts.

Figure 6:
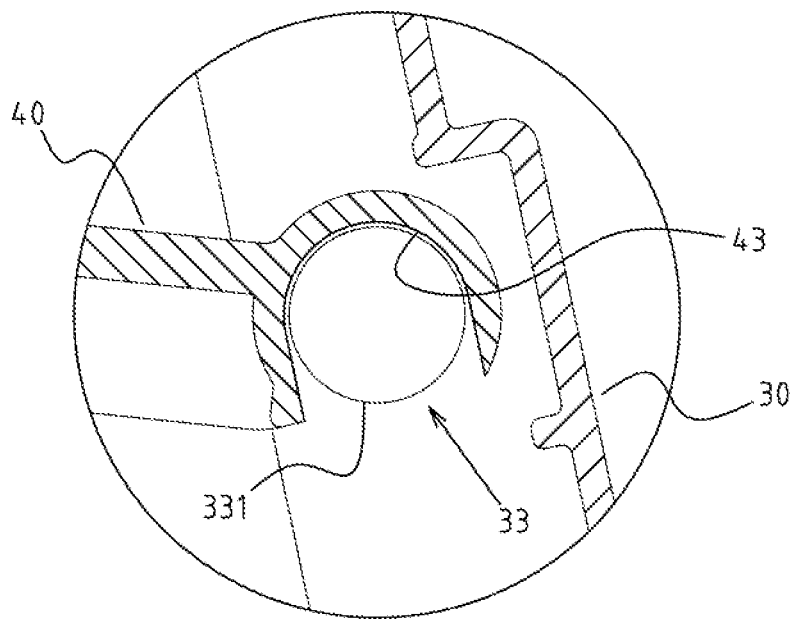
FIG. 6 is a sectional view of the pin-joint part between the lateral frames and the oblique connecting rods of the present invention.

As disclosed in FIGS. 2 and 6, the pitman pin connecting part 33 configured on the lateral frames 30 can be composed of two spaced projecting axles 331, and on the corresponding positions on the relative outside ends of the two oblique connecting rods 40, two single opening attaching slot 43 are configured. Said single opening attaching slot 43 must have a preset opening angle to join with the projecting axle 331; Such a design provides an easy structure for connection through pin-joint between the lateral frames 30 and the oblique connecting rods 40 without the need of any other auxiliary positioning parts.

Figure 3:
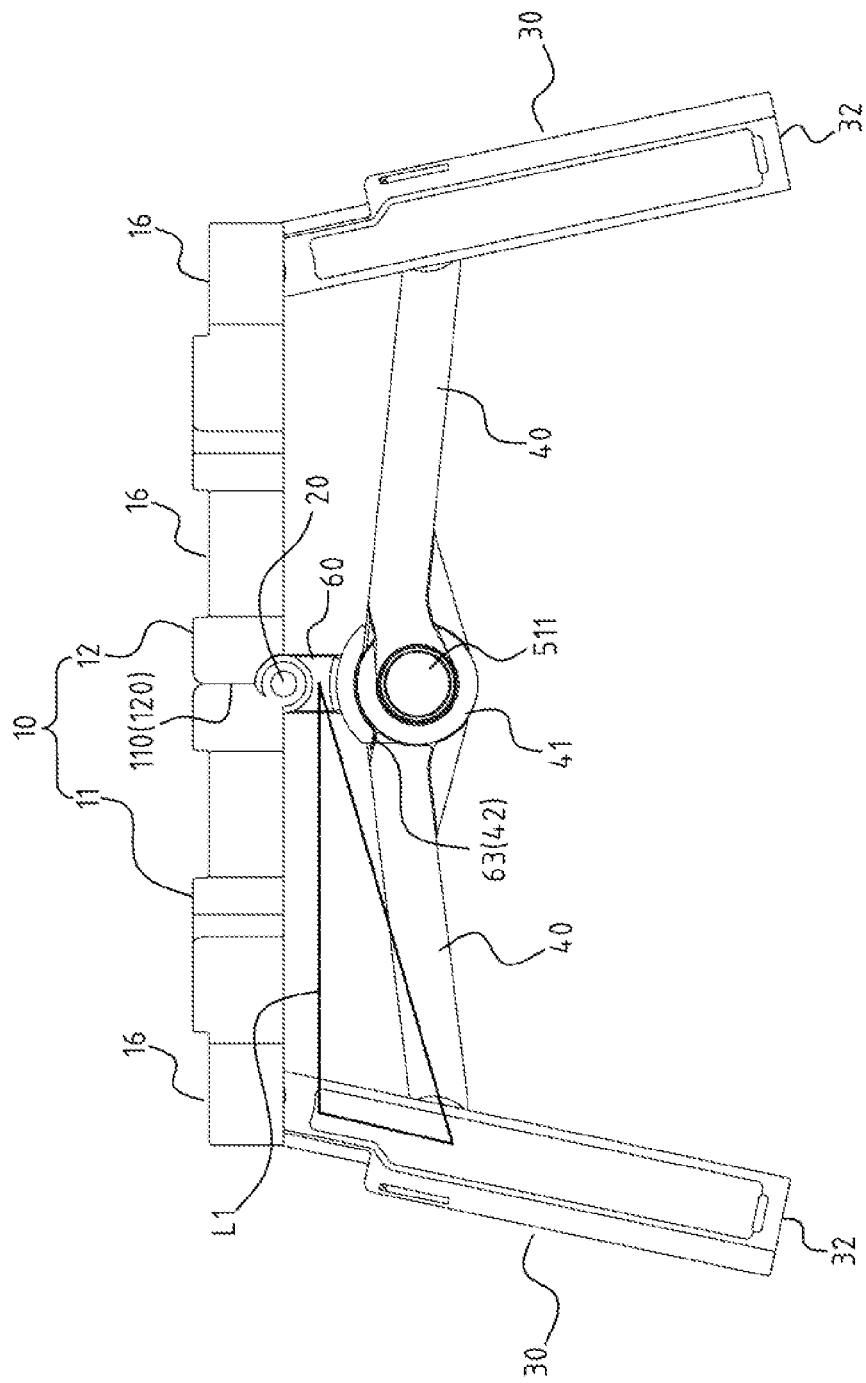
FIG. 3 is an assembled elevation of a preferred embodiment of the structure of the present invention.
Figure 4:
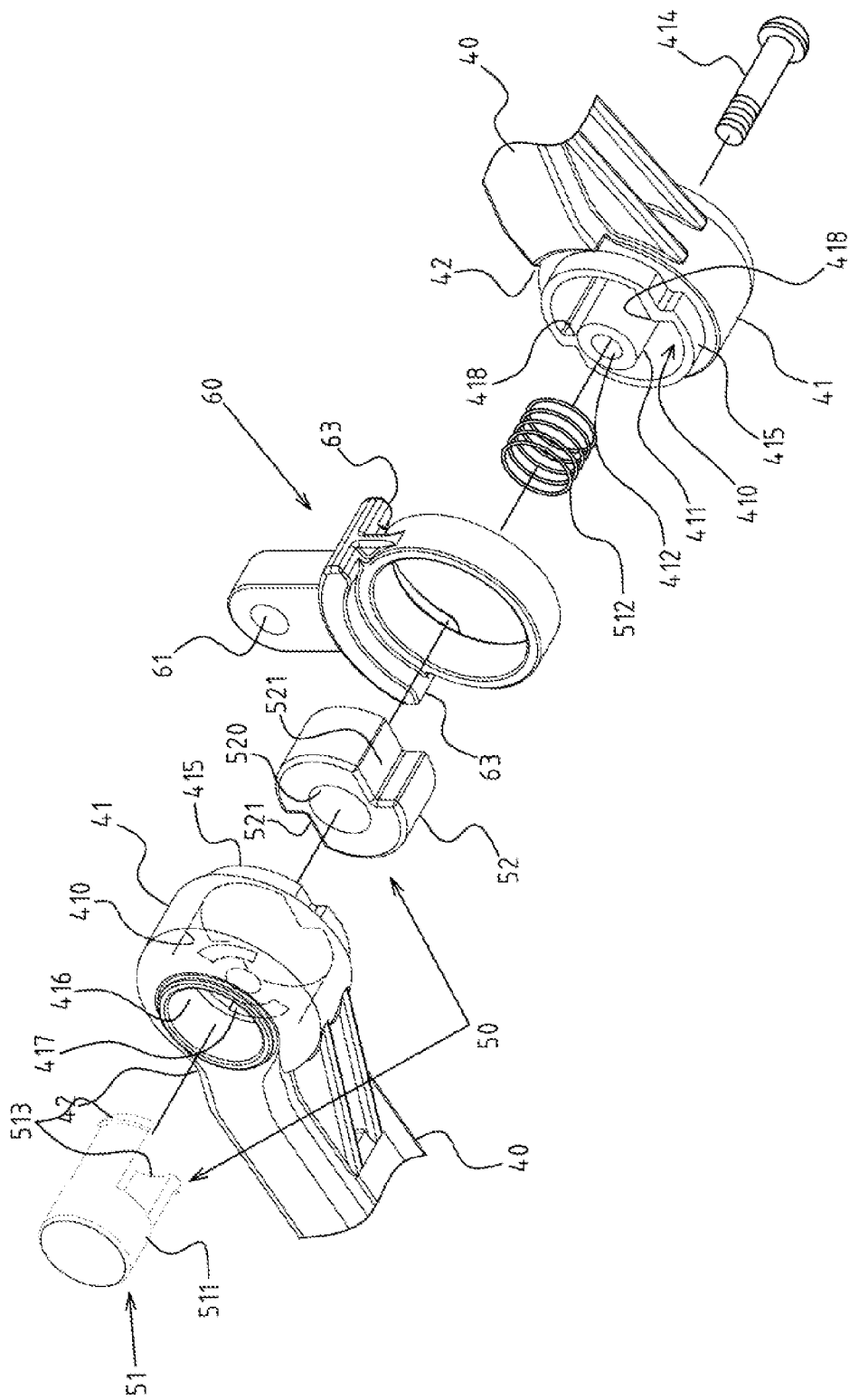
FIG. 4 is an exploded and enlarged perspective view of part of the components of the present invention.

As disclosed in FIG. 3, the top surface of the first and second panels 11, 12 of the foldable panel 10 can be further configured with spaced and parallel distributed concave attaching surface 16.

The above-described structure constitutes the construction of the present invention. FIGS. 1 and 3 depicts the unfolded state of the pitman-style foldable frame structure disclosed in the present invention. At this time, the first and second panels 11, 12 are positioned in a plane through the contacting surfaces 110, 120 on their relative inside ends contacting against each other, and the two oblique connecting rods 40 are positioned in a V-shape and supported between the two lateral frames 30. Further, the pin sleeving part 41 configured on the relative inside ends of the two oblique connecting rods 40 are connected to the first and second panels 11, 12 through the central connecting frame 60 connected with the central spindle 20, forming a I-shaped structure. As the two contacting parts 63 extended from the central connecting frame 60 can go into and contact against the receiving parts 42 configured on the relative inside ends of two oblique connecting rods 40, the central connecting frame 60 can be linked firmly in a vertical angle between the central spindle 20 and the two oblique connecting rods 40. Hence, from the central spindle 20 downward to the central connecting frame 60, till the pin sleeving parts 41 configured on the inside ends of the two oblique connecting rods 40, under this unfolded state, a stable central positioning and supporting point is formed. Therefore, for half of the pitman-style foldable frame structure, the linking points form a roughly triangular supporting structure (as shown in the virtual block line L1 in FIG. 3), and in this way, the gaps and errors in the linking positions of the foldable frame are minimized, resulting in an optimum stable supporting effect.

Figure 9:
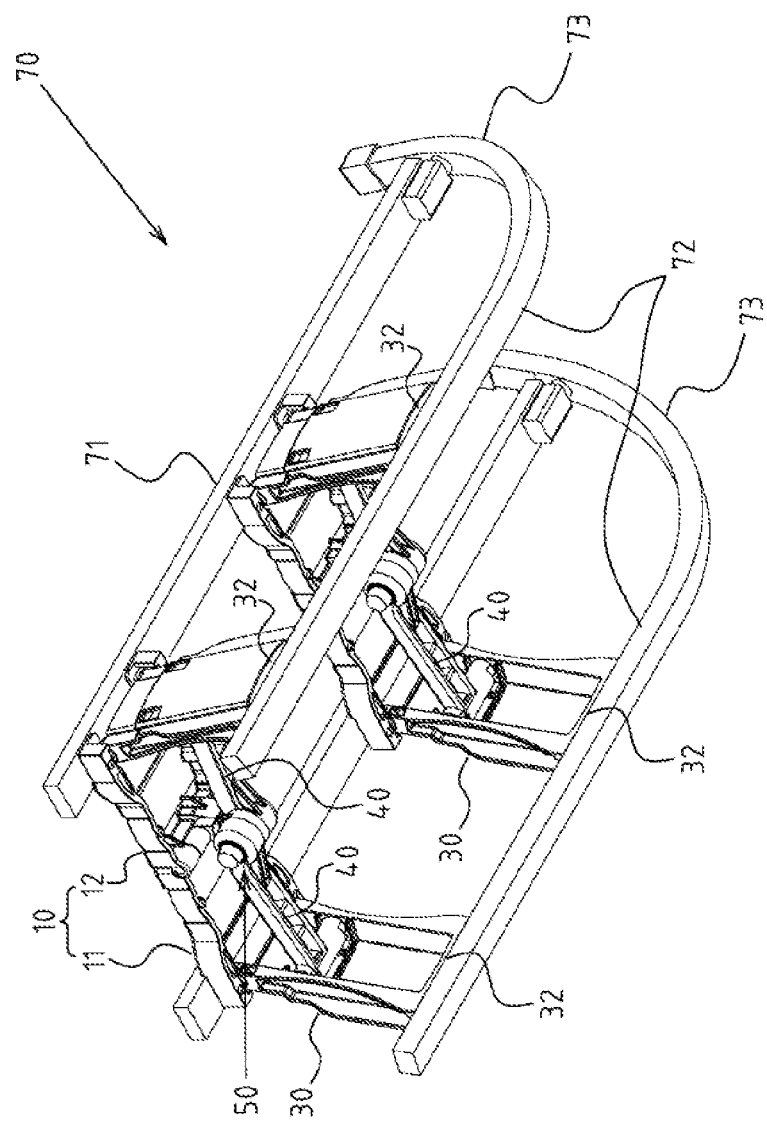
FIG. 9 depicts an example of the pitman-style foldable frame of the present invention implemented in a sled.

FIG. 9 discloses an implementation example of the present invention. In this example, the pitman-style foldable frame structure is used as the folding structure of a sled 70. The sled 70 comprises a top frame 71 and a sliding frame 72, and the front end of the sliding frame 72 is configured with a upper curving section 73 connecting with the top frame 71. There shall be at least two pitman-style foldable frame configured in the front and back between the top frame 71 and the sliding frame 72 in parallel, so that the top frame 71 is attached and fixed on the top of the first and second panels 11, 12 of the foldable panel 10 of the pitman-style foldable frame, and the sliding frame 72 is attached and fixed on the landing end 32 of the two lateral frames 30 of the pitman-style foldable frame.

Figure 10:
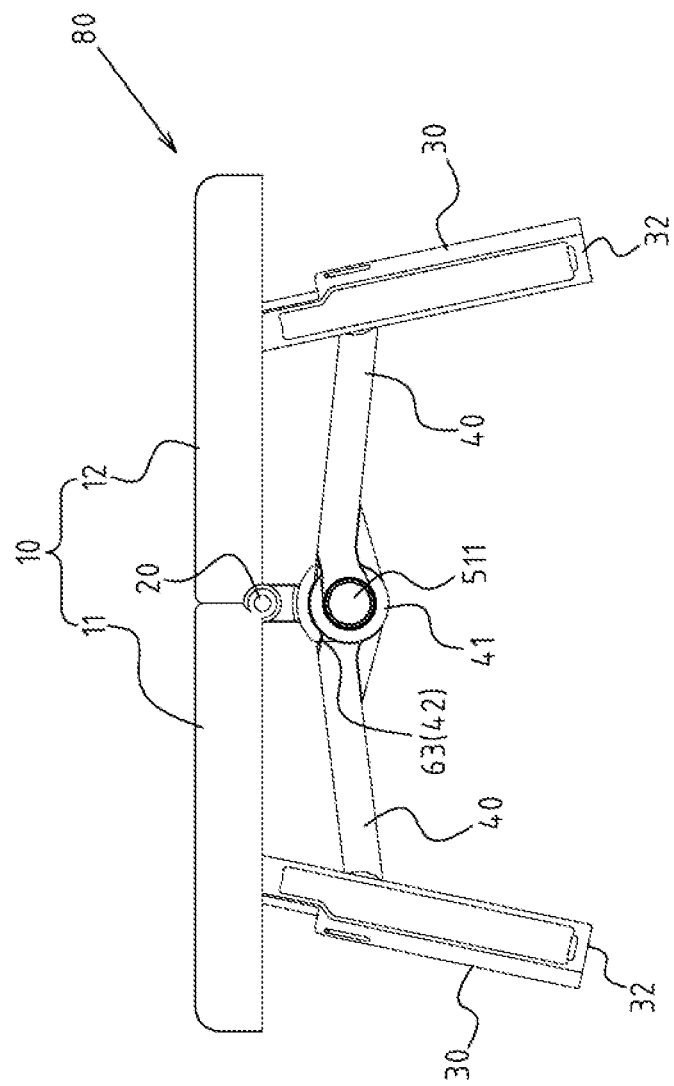
FIG. 10 depicts an example of the pitman-style foldable frame of the present invention implemented in a chair.

FIG. 10 discloses another implementation example of the present invention. In this example, the pitman-style foldable frame structure is used as the folding structure of a chair 80. The foldable panel 10 of the pitman-style foldable frame structure can be designed to be the panel part or panel attaching part of the chair 80, and the two lateral frames 30 of the pitman-style foldable frame can act directly as the legs of the chair 80. Certainly, it shall be easily understood from this example that the pitman-style foldable frame structure can also be used as the folding structure of tables. Such other implements shall be readily apparent to those of ordinary skill in the art upon a reading of this patent description and are therefore not further detailed.

We claim:

1. A pitman-style foldable frame structure comprising:
   a foldable panel having a first panel and a second panel, said first panel and said second panel having contacting surfaces at inside ends thereof contacting against each other when said first and second panels are unfolded, said first and second panels having pin connecting ears with inter-aligned and inter-communicating spindle holes on lower side of the contacting surfaces, said first panel and said second panel having a frame pin connecting part on respective outside ends thereof;
   a central spindle passing through the spindle holes in the pin connecting ears so as to form a revolving spindle when the foldable panel is folded;
   a pair of lateral frames attached to the respective outside ends of said first and second panels of said foldable panel, each lateral frame of the pair of lateral frames having a pin connecting end and a landing end, wherein the pin connecting end is attachable to said frame pin connecting part, each lateral frame of said pair of lateral frames having a pitman pin connecting part on an inner side thereof between said pin connecting end and said landing end;
   a pair of oblique connecting rods attached between the pair of lateral frames, wherein relative outside ends of the pair of oblique connecting rods are relatively attached through a pin-joint to the pitman pin connecting parts configured on the pair of lateral frames, said pair of oblique connecting rods having respective inside ends forming an upper-pointed angle and extending to a spacing position under said central spindle, the respective inside ends of the pair of oblique connecting rods having a pin sleeving part attachable to each other through another pin-joint;
   a control device attached to said pin sleeving part, said control device having a control part and a locking member, said another pin-joint of the relative inside ends of the pair of oblique connecting rods is locked when said locking member is positioned in a preset first position, said another pin joint being released and rotatable around said spindle when said locking member is positioned in a preset second position, the control part controlling and shifting the position of said locking member;
   a central connecting frame attached between said central spindle and the relative inside ends of the pair of oblique connecting rods, a top end of said central connecting frame having a through hole for the central spindle to pass through, a bottom end of said central connecting frame having an attaching seat attached between the pin sleeving parts on the inside ends of the pair of oblique connecting rods; and
   a pair of contacting parts formed through a protrusion on two respective sides on a top of said attaching seat of said central connecting frame, a receiving part positioned on the respective inside ends of the pair of oblique connecting rods for the contacting part to contact against such that said central connecting frame is linked between said central spindle and the respective inside ends of the pair of oblique connecting rods in a rigid vertical angle.

2. The pitman style foldable frame of claim 1, wherein the pin sleeving parts comprise a pair of inter-communicating concave spaces with stopping parts and a pair of inter-contacting projecting columns in a center of the concave space, the pair of projecting columns having respectively a through hole and a screw hole with a screwing member fixed thereto, the corresponding ends of the pin sleeving parts having reducing projecting pipes contacting against each other, said attaching seat being shaped like a ring and sleeving a periphery of said reducing projecting pipe, the pin sleeving part having a receiving groove, a through hole inter-communicates with the concave space of the pin sleeving part on a portion of an inside wall of the receiving groove;
   said locking member is of a block shape with a stopping edge and is housed inside the pair of concave spaces in a movable manner, a center of said locking member has a through hole loosely shielding the projecting columns, the control part of said control device having a push button and a return spring, said push button being attached in the receiving groove, an outside end of said push button projecting out of the receiving groove, an inside end of said push button having a projecting elastic clasping pin locked inside the through hole on the inner wall of the receiving groove, said return spring being supported between said locking member and an end wall of the concave space, the relative inside ends of the pair of oblique connecting rods are locked when said locking member is at an intersecting position of the pair of concave spaces, the elastic clasping pin simultaneously extending inside and pushing the locking member to shift to the inside of one concave space when the push button moves under pressure such that the relative inside ends of said pair of oblique connecting rods are released and become rotatable.

3. The pitman-style foldable frame structure of claim 1, wherein said frame pin connecting part is comprised of a pair of spaced projecting columns and a pair of oblique angle attaching slots at the corresponding position of the pin connecting end of the pair of internal frames, said oblique angle attaching slot having a preset opening angle joined with the projecting column.

4. The pitman-style foldable frame structure of claim 1, the pitman pin connecting parts having a pair of spaced projecting axles and a pair of single opening attaching slots on corresponding positions on the outside ends of the pair of oblique connecting rods, the single opening attaching slot having a preset opening angle joined with the projecting axle.

5. The pitman-style foldable frame structure of claim 1, wherein a top surface of the first and second panels of the foldable panel has spaced and distributed concave attaching surfaces arranged in parallel.

6. The pitman-style foldable frame structure of claim 1, wherein the pitman-style foldable frame structure is used as a folding structure of a sled, said sled having a top frame and a sliding frame, a front end of said sliding frame having an upper curving section connecting with said top frame.

7. The pitman-style foldable frame structure of claim 1, wherein the pitman-style foldable frame structure is used as a folding structure of a chair or a table, and wherein the foldable panel of the pitman-style foldable frame acts as a panel part or a panel attaching part of the chair or table, while the two lateral frames of the pitman-style foldable frame act as legs of the chair or table.

\* \* \* \* \*